United States Patent
Krautwurm et al.

(10) Patent No.: US 12,423,391 B2
(45) Date of Patent: Sep. 23, 2025

(54) METHOD FOR AUTHENTICATING A USER FEATURE, AND AUTHENTICATION DEVICE

(71) Applicant: Siemens Aktiengesellschaft, Munich (DE)

(72) Inventors: Florian Krautwurm, Passau (DE); Martin Metzker, Poing (DE); Markus Lachenmayr, Bavaria (DE); Tobias Appl, Nuremberg (DE); Robin Bollmann, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 431 days.

(21) Appl. No.: 17/838,627

(22) Filed: Jun. 13, 2022

(65) Prior Publication Data

US 2023/0401297 A1    Dec. 14, 2023

(51) Int. Cl.
*G06F 21/31*    (2013.01)
*G06F 21/62*    (2013.01)

(52) U.S. Cl.
CPC .......... *G06F 21/31* (2013.01); *G06F 21/6254* (2013.01)

(58) Field of Classification Search
CPC .............................. G06F 21/31; G06F 21/6254
See application file for complete search history.

(56) References Cited

U.S. PATENT DOCUMENTS

| | | | |
|---|---|---|---|
| 10,366,250 B1 * | 7/2019 | Chen | G06F 21/6245 |
| 2014/0304157 A1 * | 10/2014 | Bachenheimer | G06Q 20/02 705/44 |
| 2015/0244681 A1 * | 8/2015 | Blumenfeld | H04L 9/30 713/168 |
| 2021/0327189 A1 * | 10/2021 | Jarvis | G06Q 50/265 |

* cited by examiner

*Primary Examiner* — Chau Le
(74) *Attorney, Agent, or Firm* — Schmeiser, Olsen & Watts LLP

(57) ABSTRACT

The present invention relates to the anonymized confirmation of personal user features. A user authenticates the user features to be checked with a separate authentication device. The authentication with a service provider takes place by way of anonymized authentication information.

12 Claims, 1 Drawing Sheet

METHOD FOR AUTHENTICATING A USER FEATURE, AND AUTHENTICATION DEVICE

FIELD OF TECHNOLOGY

The present invention relates to a method for authenticating a user feature. The present invention furthermore relates to an authentication device for authenticating a user feature. The present invention relates in particular to the anonymized authentication of personal user features.

BACKGROUND

Although the present invention is described below preferably in connection with an age verification, the basic principle according to the invention is not restricted to verifying age information. On the contrary, the present invention may in principle be used to check and confirm any features, in particular personal information.

Numerous applications are reserved for a limited user group. For instance, the purchase of alcoholic beverages on the Internet may for example be permitted only to people above a certain age. Furthermore, depending on the application case, further restrictions for accessing particular applications or data content are also possible. For this purpose, it is necessary for a user to meet the necessary requirements for access. In many cases, these may involve sensitive personal data that the user has to prove for authorization.

The user therefore has to reveal these sensitive personal data for such an authorization process. The authority that performs the authorization also generally has to store these personal data in order also to be able to prove the correct authorization at a later time. In the event of a data breach when transmitting and/or storing these sensitive personal data, there is the risk of unauthorized people gaining access to the personal data. Many users therefore have considerable concerns about disclosing their sensitive personal data to third parties.

Against this background, it is desirable to provide an authentication process for sensitive personal user data in which a user only has to authorize himself with an authority classified as trusted and the further authentication process with third parties takes place using anonymized data.

SUMMARY

The present invention provides a method for authenticating a user feature and an authentication device having the features of the independent patent claims. Further advantageous embodiments are the subject of the dependent patent claims.

According to a first aspect, provision is made for a method for authenticating a user feature. The method comprises a step of authenticating at least one personal user feature. The personal user feature is in particular authenticated with an authentication device. The method furthermore comprises a step of generating anonymized authentication information by way of the authentication device. The anonymized authentication information is in particular created using the at least one user feature. The method furthermore comprises a step of providing the generated anonymized authentication information. The anonymized authentication information is in this case provided by the authentication device. Finally, the method comprises a step of confirming the at least one personal user feature to a user entity by way of the authentication device. The personal user feature is in this case confirmed using the anonymized authentication information.

According to yet another aspect, provision is made for an authentication device. The authentication device comprises a verification apparatus and a confirmation apparatus. The verification apparatus is designed to check at least one personal user feature of a user. The verification apparatus is furthermore designed to generate anonymized authentication information. The anonymized authentication information is in particular generated using the checked user feature. The confirmation apparatus is designed to confirm the at least one personal user feature to a user entity. The user feature is confirmed in particular using the anonymized authentication information.

The present invention is based on the observation that personal user data are sensitive data that are particularly worth protecting. The present invention is also based on the observation that, in order to access numerous data or applications, it is necessary to confirm or check such sensitive personal data.

One idea of the present invention is therefore that of taking this observation into consideration and carrying out the check of sensitive personal user data not using the respective application itself or a system operated at the location of the respective application, but rather performing the authentication of the personal user data by way of a specially protected system. The confirmation of successful authentication of sensitive data to the querying system may then take place in an anonymized manner. It is thereby no longer necessary for a user to reveal his sensitive personal data directly to the querying system. It is thereby possible firstly to lower the security requirements for the data transmission to the querying systems and reduce the operation of these querying systems. Furthermore, the user experiences an increased feeling of security, since he only has to disclose his personal data to a specially protected third-party authority. The querying authority itself does not in this case gain any access to the personal data to be confirmed.

As explained in even more detail below, the authentication with the protected central authority may take place either beforehand or only when required following a request by a querying authority. In both cases, a user has to authenticate his personal data only with the protected central authority. After this central authority has checked the personal data, the confirmation of the successful check to further entities may take place in a completely anonymized manner and without any back-reference to the actual personal data.

According to one embodiment, the user first receives a request to confirm a personal user feature from a user entity. The user then authenticates the personal user feature with the authentication device. The authentication device then confirms the personal user feature to the user entity by way of anonymized authentication information. The user may thereby already authenticate the required personal user features with the authentication device beforehand and then receives anonymized authentication information, for example a special token or the like. By way of this anonymized authentication information, the user may then confirm the authentication of the user information to a user entity at a later time, without in the process having to directly reveal his sensitive personal data to this user entity. The user entity may for this purpose check the received anonymized authentication information at the authentication device. It is also possible, at the time of the check, to query whether the personal user data corresponding to the respective anonymized authentication information are still valid.

According to one embodiment, the anonymized authentication information is valid only for a predetermined number of authentication processes. By way of example, each item of anonymized authentication information may be used just once, and then becomes invalid. This makes it possible to prevent for example the anonymized authentication information being able to be intercepted by an unauthorized entity and used multiple times.

According to one embodiment, the anonymized authentication information is valid only for a predetermined duration. In other words, the anonymized authentication information is assigned a kind of expiry date. This makes it possible to guarantee that the respective authentication information is not able to be used for an unlimited time to confirm the respective user features.

According to one embodiment, the method comprises a step of revoking the authentication of a previously authenticated personal user feature. In this case, the revoked previously authenticated personal user feature is no longer confirmed to a user entity after the revocation. It is thereby possible to retrospectively revoke user features that were previously confirmed and thus not to authorize any further confirmation for the corresponding user features through the anonymized authentication information potentially still in circulation.

According to one embodiment, a user first receives a request to confirm a personal user feature from a user entity. The user then authenticates the personal user feature with the authentication device. The authentication device then confirms the personal user feature to the user entity. The confirmation takes place in particular by way of the anonymized authentication information. The user thereby does not have to authenticate his personal data beforehand. On the contrary, the authentication of the personal data with the authentication device takes place only when required following a request by the user entity. For this purpose, for example, the user entity may temporarily forward the user to the authentication device. As an alternative, it is also possible for the user entity to communicate an identifier to the user. The user may then use this identifier to have his personal data checked at the authentication device, and then receives anonymized authentication information. This anonymized authentication information may in particular be linked to the respective identifier. The user entity may thereby assign the received anonymized authentication information to the respective process and have the required personal data confirmed by the authentication device by way of the anonymized authentication information.

According to one embodiment, the at least one personal user feature comprises age information, membership of a predefined group of people and/or address data. Any other user features are furthermore of course also possible. Age information makes it possible for example to confirm that a user is old enough or at least falls below or exceeds an age limit for gaining access to particular applications or data. This makes it possible for example to meet requirements for child protection or the like. Any other groups, for example by gender, denomination, membership of particular groups such as unions, parties, businesses or the like are furthermore also possible. The personal data may furthermore also comprise address data or the like.

According to one embodiment, the user, the authentication device and the user entity are each arranged in a manner spatially separated from one another. The communication between user, user entity and authentication device may in this case take place using any suitable transmission channels, in particular network connections or the like. By way of example, the individual entities may be coupled to one another via an Internet connection or the like.

The above configurations and developments may be combined with one another as desired where this is viable. Further configurations, developments and implementations of the invention also comprise combinations of features of the invention that are described above or below with respect to the exemplary embodiments but that have not been mentioned explicitly. In particular, a person skilled in the art will also add individual aspects as improvements or additions to the respective basic forms of the invention.

BRIEF DESCRIPTION

Further features and advantages of the invention are explained below with reference to the figures. In the figures.

DETAILED DESCRIPTION

Figure 1:
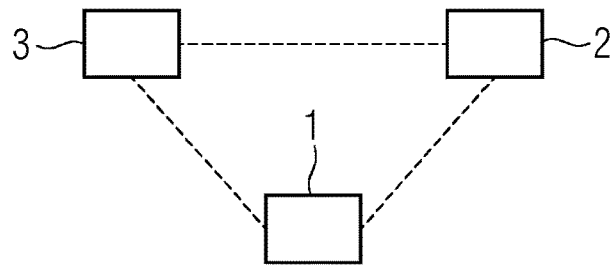
FIG. 1 shows a schematic illustration for illustrating a system containing an authentication device according to one embodiment.

FIG. 1 shows a schematic illustration for illustrating a system containing an authentication device 1 according to one embodiment. By way of example, a user entity 2 may offer a service or provide data. Access to this service or the data may in this case potentially be restricted, in particular reserved for limited user groups. It may therefore be necessary for a user 3 to have to prove his authorization to access services or data of the user entity 2. Sensitive data, in particular personal data, may potentially be necessary to prove this authorization.

By way of example, the user entity 2 may offer products or data that are reserved only for particular groups of people. For example, the sale of alcoholic beverages may be reserved only for people above a certain age. A user 3 accordingly has to prove his age in order to access such user entities. Proof of age may furthermore also be necessary for any other applications. Access to data or applications may likewise also be restricted for any other groups of people. By way of example, membership of a religion, membership in a company, a union or a party or the like or any other personal property may be checked.

In the system illustrated in FIG. 1, the check on the respective personal properties in this case does not take place directly using the user entity 2, but rather using a separate, independent authentication device 1. This authentication device 1 then confirms successful authentication of a user 3 to the user entity 2 by way of anonymized data. This makes it possible to guarantee that the user 3 has to reveal his sensitive personal data only to the authentication device 1. The user entity 2 by contrast does not gain any direct access to the personal data.

In order to authenticate or check the personal data to be checked, the user 3 provides the authentication device 1 with the information required for this purpose. By way of example, this information may involve documents such as a copy of an identification document, a membership certificate or the like. Data from an electronic identity document may potentially also be exchanged over a protected connection between the user 3 and a verification apparatus 11 of the authentication device 1 or already be verified in advance, and the verification may be stored. Any other methods for authenticating a user 3, in particular predefined authentication features, are furthermore of course also possible.

For later proof of successful authentication, the data exchanged in the course of the authentication may potentially be stored in a log apparatus 13. In the event of later doubts, it is thereby potentially possible to prove the form in which the user 3 authenticated himself with the authentication device 1.

Further personal data may also potentially be stored in a storage apparatus 14 of the authentication device 1. For instance, these additional personal data may be assigned to an authentication process and be provided when necessary. If for example misuse is identified, then these additional personal data may be requested by an investigation authority, such as for example the police or the state prosecutor.

After one or more personal user features of a user 3 have been checked with the authentication device 1, the authentication device 1, in particular the verification apparatus 11, may generate and provide anonymized authentication information. By way of example, this anonymized authentication information may be provided to the user 3.

The user 3 may then forward this anonymized authentication information to the user entity 2, without in the process having to reveal his personal data. The user entity 2 may receive the anonymized authentication information from the user 3 and use this received anonymized authentication information to query at the authentication device 1, in particular a confirmation apparatus 12, whether a required user feature for a user 3 is met by the provided anonymized authentication information. If the required authorization is granted by the authentication device 1, in particular the confirmation apparatus 12, that is to say the respective user feature is confirmed, then an application or requested data may be authorized by the user entity 2.

For this purpose, a relationship between a personal user feature to be confirmed and the corresponding anonymized authentication information may be stored in the authentication device 1.

It is potentially also possible for a previously confirmed user feature to be retrospectively revoked. In this case, such revocation may likewise be stored in the authentication device 1. As an alternative, the confirmation of authentication of a user feature in the authentication device 1 may also be erased.

The anonymized authentication information generated by the authentication device 1 may thus be used for one or potentially also several later authorizations at a user entity 2. The authorization may in this case also be restricted or limited in any way by the anonymized authentication information. By way of example, the anonymized authentication information may be information that is able to be used only for a predefined maximum number of authorization processes. For example, anonymized authentication information may also allow only a one-off authorization. Misuse through multiple use of such authentication information is thereby able to be avoided. It is furthermore also possible to restrict the authentication information to a certain period, for example an hour, a day, a week or the like following the authentication by the user. Any other restrictions of the authentication information are furthermore of course also possible.

In addition to using anonymized authentication information for proof for a particular group of people, for example for proof of age or the like, the anonymized authentication information may also be linked to any other personal data. By way of example, any anonymous operations that are reserved for certain groups of people and/or require the storage of personal data, for example for emergency situations, are possible.

By way of example, it is thus possible for a user to store his personal data, such as address data, a telephone number or the like in the authentication device 1, and to release these personal data only in particular emergency situations. By way of example, a user may thereby check into a hotel first using the anonymized authentication information. If an emergency situation occurs, for example a fire or another disaster, then it is possible to access the stored personal data using the anonymized authentication information. If on the other hand no such emergency situations occur, then the respective user is able to access the respective services completely anonymously. In addition to checking into a hotel, any other processes that could for example take place anonymously in a normal situation and only require the provision of personal data for emergency situations are also possible.

Figure 2:
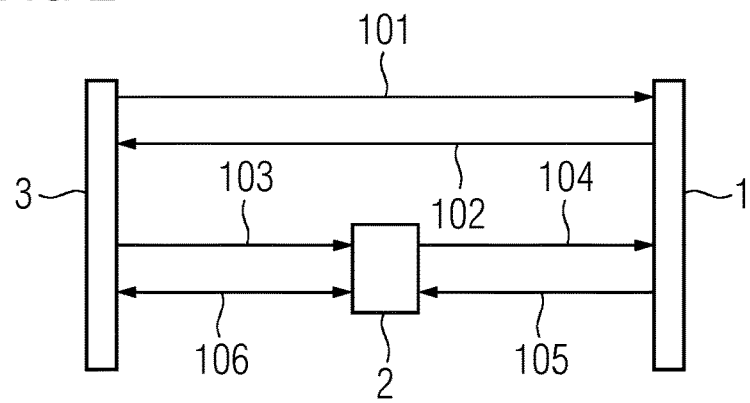
FIG. 2 shows a schematic illustration of a sequence on which a method according to one embodiment is based.

FIG. 2 again illustrates the above-described sequence of an authentication with an authentication device 1 according to one embodiment.

In step 101, at least one personal user feature is first authenticated with the authentication device 1. Anonymized authentication information is then generated by the authentication device and provided to the user 3 in step 102.

In step 103, the user may transmit this anonymized authentication information to a user entity 2. The user entity 2 forwards the received anonymized authentication information to the authentication device 1 in step 104. The authentication device 1 checks the transmitted anonymized authentication information and then confirms the successful authentication in step 105. A service or data exchange 106 between the user entity 2 and the user 3 may then be authorized.

Figure 3:
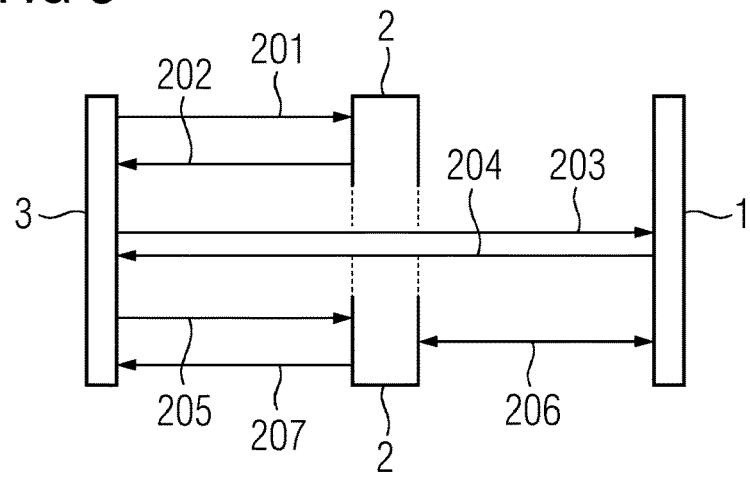
FIG. 3 shows a schematic illustration of a sequence on which a method according to a further embodiment is based.

FIG. 3 shows an alternative sequence of the check of personal user features by an authentication device 1.

In this case, a user 3 first establishes contact with the user entity 2 in step 201. The user entity 2 then transmits a request to authenticate at least one user feature in step 202. This request may for example be made in the form of a code, for example a PIN, a QR code or forwarding of a data connection to the authentication device 1.

In step 203, the user 3 then authenticates one or more personal user features with the authentication device 1. As already described above, this may take place for example by transmitting a copy of an identification document, certificates, any other documents or stored and already verified information, and in any other suitable way.

The authentication device 1 then generates anonymized authentication information and transmits this anonymized authentication information to the user 3 in step 204.

In step 205, the user 3 transmits the anonymized authentication information to the user entity 2, which checks this anonymized authentication information with the authentication device 1 in step 206. In step 207, an application or a data exchange between the user entity 2 and the user 3 may then be authorized.

Furthermore, all of the operations already described above in connection with FIGS. 1 and 2, such as the additional storage of personal data, the logging of the authentication of user features, etc., may also be implemented in this form of the authentication of user features.

In summary, the present invention relates to the anonymized confirmation of personal user features. In this regard, provision is made for a user to authorize user features to be checked with a separate authentication device. The authentication with the actual service provider then takes place using anonymized authentication information.

The invention claimed is:

1. A method for authenticating a user feature, comprising:
    authenticating, by an authentication device, at least one personal user feature;
    generating, by the authentication device, anonymized authentication information using the at least one user feature;
    providing, by the authentication device, the generated anonymized authentication information to the user for forwarding to a user entity;
    receiving, by the authentication device, the generated anonymized authentication information from the user entity; and
    in response to the receiving from the user entity, confirming, by the authentication device, the at least one personal user feature to the user entity to authorize a service or data exchange between the user and the user entity;
    wherein the authentication device is separate and independent from the user entity.

2. The method as claimed in claim 1, wherein a user first authenticates the at least one personal user feature with the authentication device and then receives the anonymized authentication information; and
    wherein the user forwards the anonymized authentication information to the user entity, such that the authentication device is able to confirm the personal user feature to the user entity using the anonymized authentication information.

3. The method as claimed in claim 2, wherein the anonymized authentication information is valid only for a predetermined number of authentication processes.

4. The method as claimed in claim 2, wherein the anonymized authentication information is valid only for a predetermined duration.

5. The method as claimed in claim 2, comprising a step of revoking the authentication of a previously authenticated personal user feature,
    wherein the authentication device does not confirm the revoked previously authenticated personal user feature to a user entity.

6. The method as claimed in claim 1, wherein a user first receives a request to confirm a personal user feature from a user entity,
    the user then authenticates the personal user feature with the authentication device, and
    the authentication device then confirms the personal user feature to the user entity by way of anonymized authentication information.

7. The method as claimed in claim 1, wherein the at least one personal user feature comprises age information, membership of a predefined group of people and/or address data.

8. The method as claimed in claim 1, wherein the authentication device, the user and the user entity are each arranged in a manner spatially separated from one another.

9. The method as claimed in claim 1, wherein the authenticating the at least one personal user feature is in response to receiving data from an electronic identity document exchanged over a protected connection between the user and the authentication device.

10. An authentication device, comprising:
    a verification apparatus that is designed to check at least one personal user feature of a user and to generate anonymized authentication information using the checked user feature for forwarding, by the user, to a user entity; and
    a confirmation apparatus that is designed to receive the generated anonymized authentication information from the user entity and, in response to the receiving from the user entity, confirm the at least one personal user feature to the user entity to authorize a service or data exchange between the user and the user entity;
    wherein the authentication device is separate and independent from the user entity.

11. The authentication device as claimed in claim 10, having a log apparatus that is designed to store data of the check of the at least one personal user feature.

12. An authentication device comprising:
    a storage apparatus that is designed to store personal data of a user for a checked personal user feature;
    wherein the authentication device is designed to:
        provide the stored personal data of the user for a checked personal user feature using the corresponding anonymized authentication information, to the user for forwarding to a user entity,
        receive the generated anonymized authentication information from the user entity,
        in response to the receiving from the user entity, confirm the at least one personal user feature to the user entity to authorize a service or data exchange between the user and the user entity;
    wherein the authentication device is separate and independent from the user entity.

* * * * *